UNITED STATES PATENT OFFICE.

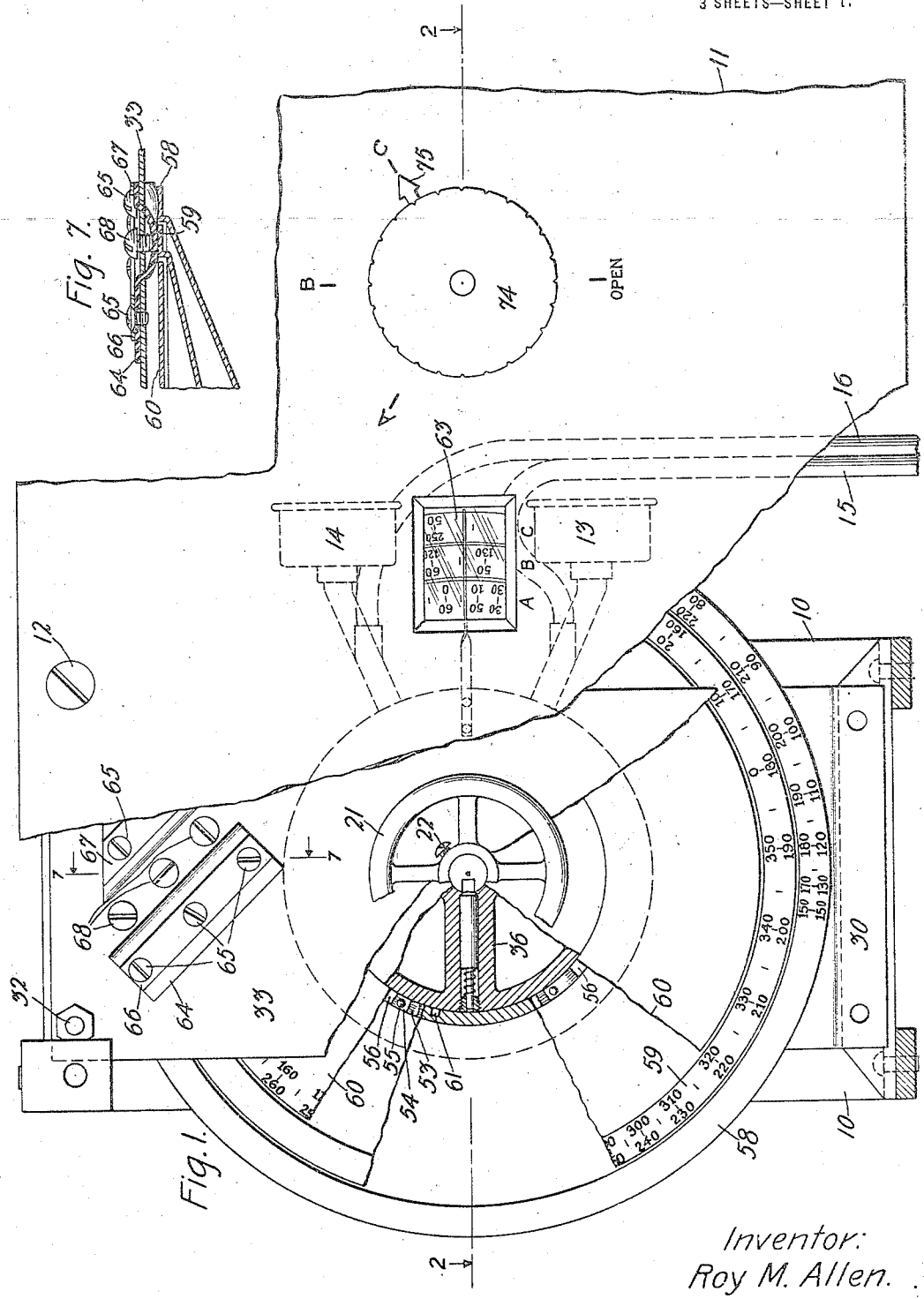

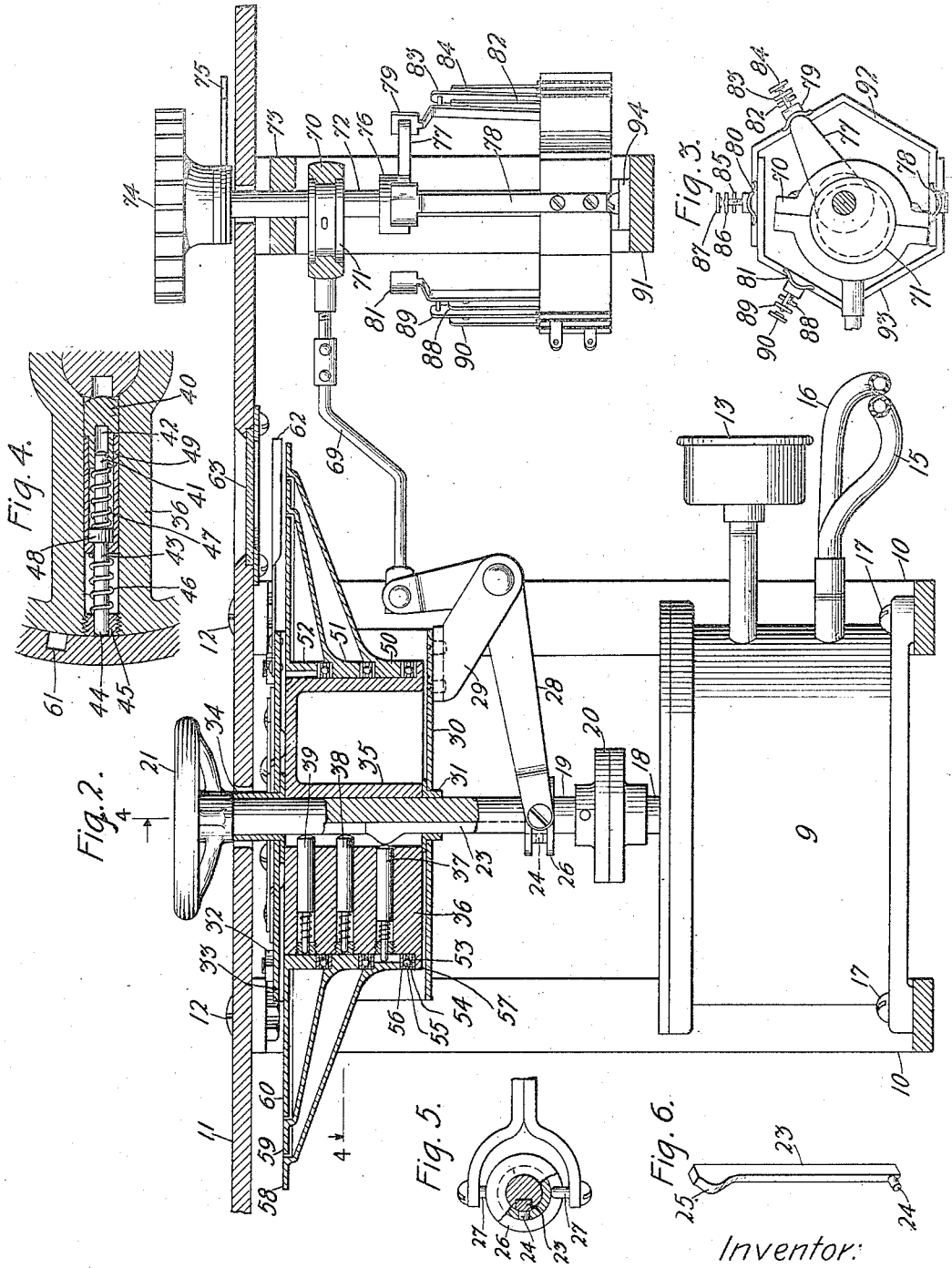

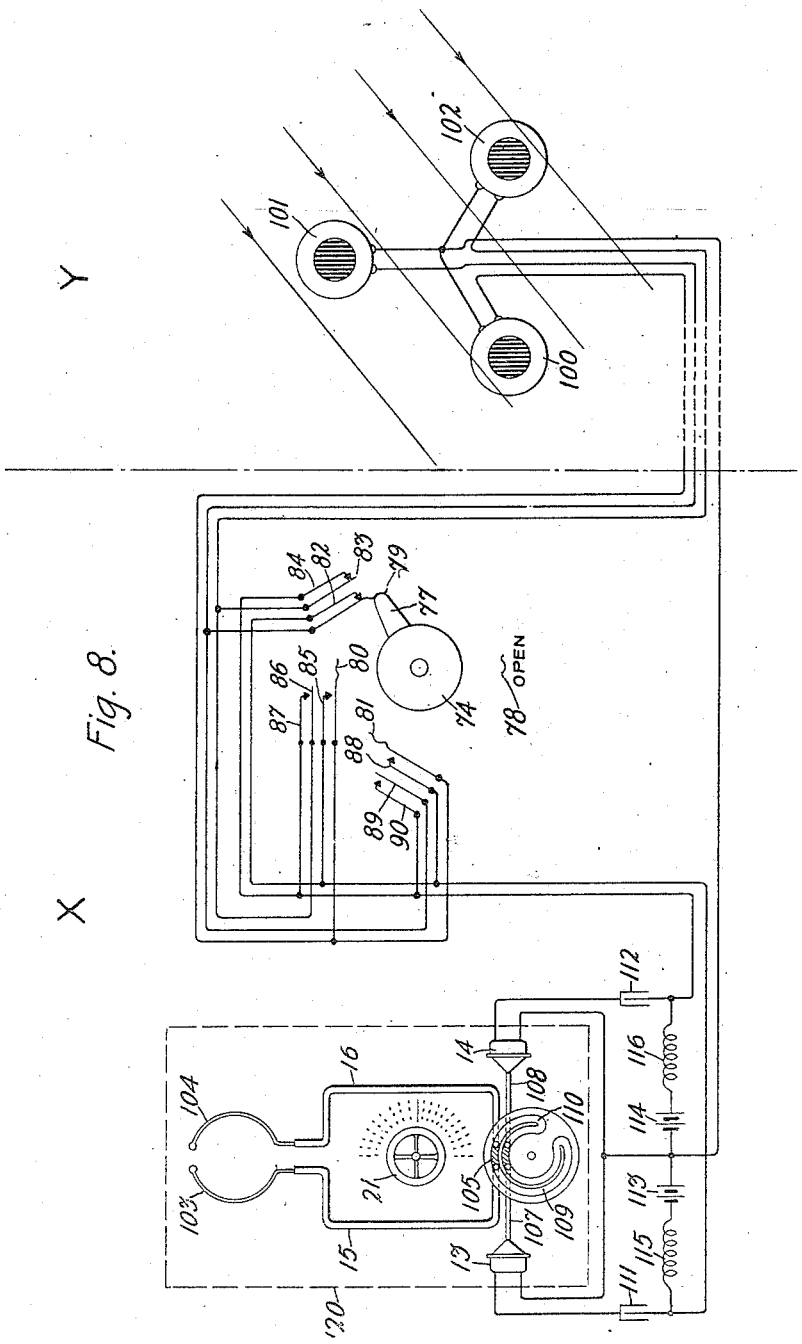

ROY M. ALLEN, OF EAST ORANGE, NEW JERSEY, ASSIGNOR TO WESTERN ELECTRIC COMPANY, INCORPORATED, OF NEW YORK, N. Y., A CORPORATION OF NEW YORK.

SWITCHING SYSTEM AND INDICATING DEVICE THEREFOR.

1,382,262. Specification of Letters Patent. Patented June 21, 1921.

Application filed July 16, 1919. Serial No. 311,204.

*To all whom it may concern:*

Be it known that I, ROY M. ALLEN, a citizen of the United States, residing at East Orange, in the county of Essex and State of New Jersey, have invented certain new and useful Improvements in Switching Systems and Indicating Devices Therefor, of which the following is a full, clear, concise, and exact description.

This invention relates to switching systems and indicating devices therefor and more particularly to such systems and devices employed in the detection of sources of vibration.

In some switching systems, especially those employed in the location of sources of mechanical vibration, it is desirable to selectively observe from one point, the effect produced by such vibrations upon a plurality of responsive devices or detectors occupying relatively fixed positions.

Heretofore it has been proposed to determine the direction of a source of sound by the more or less unconscious comparison of the effects produced by such sounds upon both ears of the observer. Thus a source of sound placed equidistant from the ears of the observer produces a sense of balance known as a binaural balance due to the simultaneous arrival at both ears of the identical sounds so that the observer unconsciously deduces that the source is directly ahead. In using this method in determining the direction of a source of sound, a pair of spaced acoustical devices are employed, the effects of the sound thereupon being conveyed over independent paths to the opposite ears of the observer. By rotating the spaced devices until a binaural balance is secured, the same effect is produced as if the observer turned bodily to face the source. It has been demonstrated by experiment that the same effect may be obtained by retaining the separated acoustical devices in a fixed position and by varying the relatively effective lengths of the paths leading to the ears of the observer until a binaural balance is obtained. In this case the necessary relative variation in the lengths of the paths indicates the amount of rotation of the devices which would be required to insure that their interconnecting base line is normal to the direction of the source of sound, or in other words, that the vibrations are received simultaneously at the two devices.

In order to accomplish this result, use has been made of a so-called acoustical compensating device containing independent sound paths leading from the acoustical devices to the ears of the observer, so arranged that any variation in the length of one path is accompanied by a similar but inverse variation in the length of the other path. Suitably calibrated indicating means have been associated with the compensating device to translate the attained variations in the lengths of the paths into degrees of angular displacement from a line normal to the base line of a line connecting the source with the base line.

In one method which has been quite successfully used in the detection of submarine or other marine vessels, the acoustical devices take the form of suitably submerged vibration detectors similar to telephone transmitters placed at considerable distances from the observing point and which, in response to mechanical vibrations propagated through the water, cause changes in the electrical conditions of similar circuits associated therewith which lead to the observing station. The acoustical compensating device at the observing station is equipped with means similar to telephonic receivers adapted for association with such circuits to translate the electrical changes into audible effects which are then conveyed through the sound paths of the compensator to the ears of the observer.

Thus the actuation of the compensator to obtain a binaural balance compensates for the difference in time or arrival of the sound waves at the distantly located spaced detectors under observation by varying the lengths of the acoustic paths from the receivers, the lengths of the electrical paths remaining constant. In another system which has been proposed, this compensation is produced by varying the relatively effective lengths of the electrical circuits by altering the characteristics thereof the sound paths remaining constant.

However, such observations do not indicate upon which side of the base line the source may be located and in order to definitely determine the location of such source with precision, it is necessary to determine its relation to the base line interconnecting similar acoustical devices occupying different relative positions. Three detectors of this nature placed at the apices of an equilateral triangle provide a convenient arrangement for the definite determination of the location of a source of vibration. By binaurally observing the response of the three detectors in t'ree differing pairs and in each case noting the angular displacement of the source of sound from a line normal to the side of the interconnecting triangle, sufficient data is obtained so that the location of the source relative to the group of detectors may be definitely determined by proper triangulation. With this arrangement, it is usual to provide separate graduated indicating scales for individual association with the compensator while the response of each pair of detectors is being observed. Each scale contains a set of angular degree markings indicating the displacement from a line normal to either side of the base line interconnecting the associated pair of detectors. The changes in the lengths of the sound paths of the compensating device are usually effected by the rotation of a moving element, the angular displacement of which is a sine function of the angular displacement of the source from a line normal to the base line interconnecting the pair of detectors under observation and the scales are graduated accordingly. The degree markings of the various scales are properly displaced to correspond with the readings to be obtained from the associated sides of the triangle.

In the operation of a system of this nature, it is therefore important that each scale be arranged to be selectively associated with the compensator while an observation is being made relative to the associated pair of detectors, and in order to prevent confusion as well as to eliminate loss of time, it is desirable that each of the scales be automatically shifted into operative condition under control of the detector pair selecting means.

Since the appearance at a predetermined point of similar degree markings or graduations of the various scales upon obtaining the binaural balance between different pairs of detectors definitely determines the location of the source of vibration as compared with the group of detectors, it is desirable that the operating scale be retained in position upon obtaining a balance so that it may be compared with the succeeding scale, thus obviating the necessity of separately recording the readings in each instance.

It is one object of the invention to provide a mechanism controlled by a selecting means for selectively causing the operative association of a plurality of indicating means with a compensating device.

A further object of the invention is to provide a plurality of indicating means adapted for selective association with a compensator to be retained in indicating position upon disassociation from the compensator.

Another object of the invention is to provide an improved switching system for the detection of sources of mechanical vibration in which the association of a plurality of indicating means with a compensator is selectively controlled by detector selecting means.

In order to attain these objects in accordance with one feature of the invention, an indicating device for a compensator is provided with a plurality of indicating scales adapted for selective individual association therewith under control of a selecting means. More specifically, a vibration detector pair selecting means is mechanically connected with a mechanism for selectively locking a plurality of differently arranged normally disassociated indicating scales with the operating shaft of a compensator, thereby insuring the use of the proper scale in connection with the binaural observation of the response of the selected pair of detectors.

Another feature of the invention resides in the provision in a plural scale indicating compensator of means for positively retaining any scale in its attained position upon its disassociation from the compensator.

A further feature of the invention resides in the provision in a system for the detection of mechanical vibrations of means to automatically associate the proper scale with an acoustical compensator upon the selection of for observation of a pair of vibration detectors.

These and other features, not specifically mentioned above, will clearly appear from the following specification and the annexed drawings in which Figure 1 shows a top plan view, partially in section, of a compensator associated with a switching device and embodying the invention; Fig. 2 shows an elevation thereof partially in section, along the line 2—2 of Fig. 1; Fig. 3 shows a detailed plan view of the switching device; Fig. 4 shows a sectional view along the line 4—4 of Fig. 2; Fig. 5 shows the detailed arrangement for shifting a cam key associated with the shaft of the device; Fig. 6 shows a perspective view of the cam key; Fig. 7 shows a section along the line 7—7 of Fig. 1; and Fig. 8 shows a switching system for the detection of sources of vibration, in which system the compensator and the associated switch are employed.

Referring more particularly to Figs. 1 to 7, inclusive, of the drawing, two members 10—10 suitably secured to the under side of an observing table top 11 by means of bolts 12—12 are formed to provide a support in which an acoustical compensator 9 is secured by means of screws 17. The construction of the compensator 9 is not shown in detail since it is not essential to a clear understanding of the invention. A compensator of the general type disclosed in the copending joint application Serial No. 306,408, filed June 24, 1919, by Roy M. Allen and George F. Atwood, may be used to advantage. However, any other suitable type may be employed in which the rotation of a shaft simultaneously causes a similar but inverse variation in the lengths of independent sound paths extending from sound producing devices such as inclosed telephone receivers 13—14 and the respective ear pieces (not shown) associated with equal length stethoscopic tubes 15 and 16. It is also possible to employ the so-called electrical compensator as disclosed by application, Serial No. 321,512, filed September 4, 1919, by Francis A. Hubbard, adapted to vary the relatively effective lengths of electrical paths leading from distant vibration detectors to telephone receivers associated directly with the ears of the observer. An extension shaft 19 suitably attached to a compensator shaft 18 by a coupling 20 extends upward through an aperture in the table top 11 and terminates in a suitable operating hand wheel 21 secured thereto by a set screw 22. A cam key 23, shown in detail in Fig. 6, slidably mounted within a longitudinal channel or key-way in the shaft extensions 19 is provided with a projecting pin 24 near its lower end and a cam portion 25 near its upper end. The pin 24 engages an aperture in a collar 26 loosely surrounding the shaft 19, the exterior of such collar being provided with a horizontal channel for the reception of inwardly extending diametrically opposed pins 27 in the bifurcated end of a long arm of a bell crank 28 suitably pivoted at the end of a depending strut member 29 secured to the under side of a depressed bridge 30. The arrangement of the collar and the associated members is shown in detail in Fig. 5. The shaft 19 is journaled at 31 in the bridge 30 and is attached by bolts 32 to an upper plate 33 in which the shaft 19 is also journaled at 34. A hollow drum 35, interposed between the members 30 and 33, is suitably attached to and rotates with the shaft 19. A spoke 36 of the drum contains similar spring actuated plungers 37, 38 and 39 located in line with the key-way in the shaft 19, in which the key 23 operates. Each of these plungers, as shown in detail in Fig. 4, comprises a rounded operating head 40 on one end of a shell or casing 49 in which a plunger rod 43 is mounted so that one portion thereof, terminating in a pin 44 extending into a bushing 45 in the wall of the drum, projects through an aperture in the opposite end of the casing and another portion terminating in a pin 41 extends within the casing, the pin 41 slidably engaging a longitudinal bore 42 in the head 40. A coiled spring 47 interposed between the rear surface of the head 40 and one surface of a collar 48 suitably secured to the plunger rod 43 tends to maintain the other surface of the collar 48 substantially in contact with the interior of the end wall of the casing 49. A coiled spring 46 interposed between the end of the casing 49 and the bushing 45 tends to maintain the shell or casing 49 in position so that the head 40 bears against the shaft 19. Loosely surrounding the drum 35, lower, intermediate and upper sleeves 50, 51 and 52, respectively, are placed.

As shown in Fig. 4 in the normal unoperated condition of the device, the pin 44 of each plunger out of contact with the interior wall of the respective sleeve, the collar 48 being in contact with the end wall of the casing 49, and the springs 46 and 47 being substantially uncompressed and the pin 41 extending partially into the bore 42. However, when the cam surface 25 of the key 23 engages the head 40, the casing 49 is shifted to compress the spring 46 and the pin 44 is forced against the interior wall of the associated sleeve thereby causing the compression of the spring 47. Suitable bearing rings 53 and 56, separated by a ring 54 provided with a plurality of apertures for retaining ball bearings 55, are introduced between the shoulder 57 formed on the lower end of the drum 36 and the lower sleeve 50. Similar bearing rings and ball bearings are also interposed between the adjacent sleeves. Suitably formed extensions of the sleeve 50, 51 and 52 provide interior, intermediate and exterior concentric horizontal surface portions or shelves 58, 59 and 60, respectively, occupying the same plane. Each sleeve 50, 51 and 52 is provided with a vertical slot 61 in the interior wall thereof such slot being so located that when it is opposite the respective pin 44 and the cam surface 25 of the key 23 is in engagement with the associated head 40, the spring 47 is released causing the pin 44 to engage such slot. The associated sleeve thereafter rotates with the shaft 19 when such shaft is operated by the hand wheel 21.

However, it will be noted that when the key 23 is shifted either upward or downward a sufficient amount to disengage the cam 25 from the head 40 the spring 46 expands to shift the casing 49 for withdrawing the pin 44 from the engaged slot 61 and for causing the head 40 to reassume its normal position in engagement with the key-way in shaft 19. In this manner the shifting of the cam surface 25 of the key 23, in response to a vertical movement of the collar 26, caused by the bell crank 28, selectively and operatively associates the various sleeves 50, 51 and 52 with the shaft 19.

Each of the horizontal surfaces 58, 59 and 60 is provided with a suitable sine scale graduated to indicate the angular relation of sources of sound to a base line interconnecting a pair of detectors and when rotating with the shaft of the compensator moves past a pointer 62 suitably secured to the upper plate 33 and extending across a transparent window 63 in the table top 11.

Near each end of the upper plate 33, an adjustable friction means is provided comprising a strip 64 of rubber covered canvas or other suitable material threaded through parallel slots in the plate 33, as shown in detail in Fig. 7, the ends thereof being secured to the upper surface of the plate by means of retaining metal strips 66 and 67 coöperating with screws 65 threaded into the plate 33. Screws 68 threaded through the plate 33 directly over each of the surfaces 58, 59 and 60 provides means for individually adjusting the pressures exerted by the strip 64 upon such surfaces. By properly adjusting these screws and pressures exerted at substantially diametrically opposite points, it is possible to immediately stop the rotation of any such surface upon the disassociation of the corresponding sleeve from the shaft 19.

The short arm of the bell crank 28 is coupled by a connecting link 69 to a split collar 70 suitably clamped around an eccentric 71 and secured in position by a channel in such eccentric. The eccentric 71 is suitably secured to and rotated by a vertical shaft 72 rotatably supported in a framework of any suitable design providing a bearing in a member 91 and a channel in a member 73, which members are supported by vertical side portions suitably attached to the under side of the table top 11. The shaft 72 extends through an aperture in the table top 11 and the upper end thereof is provided with a handle or knob 74 carrying an index or pointer 75, whereby the shaft may be rotated as desired. An enlarged portion 76 of the shaft 72 carries an arm 77 which selectively engages springs 78, 79, 80 and 81. These springs are so formed that the arm 77 may not be accidentally disengaged therefrom. Each of the springs 79, 80 and 81 controls a bank of contact springs. When the arm 77 engages with spring 79, contact is made between such spring and spring 82, and between springs 83 and 84. Similarly, contact is made between springs 86 and 87 and between spring 85 and the operating spring 80 when the latter is engaged and between contact springs 89 and 90, and between contact spring 88 and the operating spring 81 when the latter is engaged. The banks of suitably insulated contact springs are mounted upon a hexagonal framework composed of members 92 and 93 supported at the junctions thereof by suitable lugs 94 extending from the member 91. As the shaft 72 is rotated by the handle 74 the eccentric 71 operating within the collar 70 causes the horizontal movement of the connecting link 69 which in turn actuates the bell crank 28 to cause a vertical movement of the collar 26 and the associated cam key 23 mounted in the shaft 19. When the arm 77 engages the spring 79, as shown in Figs. 2 and 3, the sleeve 50 is locked upon the shaft 19 and similarly, sleeves 51 and 52 are individually locked upon the shaft when the arm 77 engages springs 80 and 81, respectively.

In Fig. 8, an observing station X, which may be located at some convenient point on the shore, is connected with a detecting station Y at which there are provided detectors 100, 101 and 102 preferably placed at the apices of an equilateral triangle and supported by a tripod or other suitable framework in a predetermined fixed position. These detectors may be of any suitable type adapted to change the electrical conditions of an associated circuit in response to vibrations propagated through the water, such as disclosed in the Charles R. Moore application, Serial No. 324,803, filed September 19, 1919.

The structures shown in Figs. 1 to 7, inclusive, located at the observer's station X, are diagrammatically illustrated, the compensator together with the associated receivers, stethoscopic tubes, operating hand wheel, and scales being included within a dotted rectangle 120. The receiver 14 is acoustically connected with an ear piece 103 (not shown in Figs. 1 to 7) through serially interconnected air tubes 107, 109 and 15, while receiver 14 is acoustically connected with an ear piece 104 (not shown in Figs. 1 to 7) through serially interconnected air tubes 108, 110 and 16. A movable stop member 105 which is rotated by hand wheel 21 causes a simultaneous and equal but inverse variation in the lengths of the adjustable air tubes 109 and 110 of the compensator 9. A battery 113 is adapted to supply operating current through a retardation coil 115 to any detector associated with the receiver 13 while a battery 114 is adapted to supply operating current through a retardation coil 116 to any detector associated with receiver 14. The condensers 111 and 112 are included in series with the receivers 13 and 14 respectively, to prevent the flow of direct current therethrough.

It is thought that the invention may be more clearly comprehended from the following description of the operation of the system shown in Fig. 8 and the corresponding actuations of the associated structures shown in Figs. 1 to 7 inclusive.

Assuming that the switch is in its normal or open position with the arm 77 engaging spring 78, no current is supplied to any of the current varying devices of the detectors and although the position of the eccentric 71 is such that the cam 25 of the key 23 may be in engagement with the operating head of one of the plungers 37, 38 and 39, thereby connecting the associated sleeve with the drum 35, no disadvantage results therefrom since no detectors are connected to the compensator. The handle 74 is then rotated in a counter-clockwise direction until the pointer 75 is in position C, whereupon arm 77 engages operating spring 79, as shown, thereby establishing a circuit from one side of battery 113, through the resistance varying device of detector 101, springs 79 and 82, and retardation coil 115 to the other side of battery 113. A second circuit is also established from one side of battery 114 through the current varying device of detector 102, springs 83 and 84 and retardation coil 116 to the other side of battery 114. The current variations caused in these circuits by the action of the responsive members of detectors 101 and 102 upon the receipt of mechanical vibrations propagated through the water, flow through condenser 111 to receiver 13 and through condenser 112 to receiver 14 respectively. The sounds thereby produced in receivers 13 and 14 are conveyed through serially interconnected air tubes 107, 109 and 15 to ear piece 103 and through serially interconnected air tubes 108, 110 and 16 to ear piece 104 respectively.

While the arm 77 is being rotated to engage spring 79, the eccentric 71 also rotates with the shaft 72 so that the link 69 causes the bell crank 28 to move the collar 26 and the associated movable key 23 until the cam surface 25 engages and moves the head 40 of the plunger 37. The pin 44 of the plunger 37 thereupon bears against the interior wall of the sleeve 50. The hand wheel 31 is then rotated until the pin 44 of the plunger 37 engages the slot 61 in the interior wall of the sleeve 50, thereby locking such sleeve to the shaft 19 so that the associated scale 58, designed for use with the pair of detectors 101 and 102, is operatively associated with the compensator 9. The observer listening binaurally to the sounds emitted from the ear pieces 103 and 104 then rotates the hand wheel 21 in the proper direction until a binaural balance is obtained, the angular displacement of the source of sound from a line normal to the base line interconnecting the detectors 101 and 102 being indicated by the designated graduations on the scale 58 appearing directly underneath the pointer 62. However, it is not necessary for the observer to take any notice of such designations since, as hereinafter described, the scale 58 is positively retained in its attained position.

The observer then turns the handle 74 in a counter-clockwise direction until the pointer 75 is in position B, whereupon arm 77 disengages the operating spring 79, to disable the previously traced circuits for detectors 101 and 102, and subsequently engages the operating spring 80. A circuit is thereupon established from one side of battery 113, through the current varying device of detector 100, springs 80 and 85, and retardation coil 115 to the other side of battery 113, and another circuit is established from one side of battery 114, through the current varying device of detector 102, springs 86 and 87, and retardation coil 116 to the other side of battery 114. Thus current variations produced by detector 100 in the associated circuit, flow through receiver 13, and those produced by detector 102 flow through the receiver 14. During such rotation of the handle 74, the eccentric 71 causes a further upward movement of the key 23, the cam surface 25 thereof disengaging the head 40 of the operated plunger 37, thereby disengaging the associated pin 44 from the slot 61 of the sleeve 50 and subsequently engaging the head 40 of the plunger 38. The hand wheel 21 is then rotated until the pin 44 of the plunger 38 bearing against the interior wall of the sleeve 51 engages the slot 61 of such sleeve. Due to the pressure exerted by the friction strip 54 upon the scale surface 58, the rotation of sleeve 50 ceases immediately upon the disengagement of the pin 44 of plunger 37 from the slot 60 in such sleeve. Therefore the attained position of scale 58 in relation to the pointer 62 is maintained. As before, the hand wheel 21 is then rotated in the proper direction until a binaural balance is obtained, the position of the scale 59 in relation to the pointer 62 indicating the angular displacement of the source of vibration from a line normal to the base line interconnecting detectors 100 and 102.

The handle 74 is then rotated in an anti-clockwise direction until pointer 75 is in position A, whereupon arm 77 disengages operating spring 80 to disable the previously traced circuits for detectors 100 and 102, and subsequently engages the operating spring 81. A circuit is thereupon established from one side of battery 113, through the current varying device of detector 100, springs 81 and 88, and retardation coil 115 to the other side of battery 113. Another circuit is also established from one side of battery 114, through the current varying device of detector 101, springs 89 and 90, and retardation coil 116 to the other side of battery 114. Thus current variations produced by detectors 100 and 101 flow through receivers 13 and 14, respectively. During the above-mentioned rotation of the handle 74, the eccentric 71 causes a further upward movement of key 23, the cam surface 25 thereof disengaging the head 40 of the operated plunger 38, thereby disengaging the associated pin 44 from the slot 61 of the sleeve 51 and subsequently engaging the head 40 of the plunger 39. As before, the friction member 64 causes the scale 59 and the associated sleeve 51 to cease rotating immediately upon the disengagement of the pin from the slot 60 in the sleeve 52. The hand wheel 21 is then rotated until the pin 44 of the plunger 39 bearing against the wall of sleeve 52 engages slot 61 of such sleeve. As before, hand wheel 21 is then rotated until a binaural balance is obtained between the sounds emitted by the ear pieces 103 and 104, the designated graduations appearing underneath the pointer 62 indicating the angular displacement of the source of vibration from a line normal to the base line interconnecting detectors 100 and 101.

Each of the scales 58, 59 and 60 being held in the position which it attains when the binaural balance is secured between the associated detectors, a comparison of the various designations or graduations appearing underneath the pointer may be readily made. A duplication of such indications on the similar halves of two scales indicates which half scale of the one formerly used should be employed in obtaining the exact reading, or in other words, on which side of the base line interconnecting the associated detectors the source of vibration is located. By reassociating such detectors and such scale with the compensator, an exact reading may then be obtained which represents the true angular displacement of the source from the line normal to the base. From the data obtained in this manner it is possible to definitely determine the exact location of the source of vibration by a process of triangulation.

It will be noted that the screws 68 provide for adjustment of the friction strip 64 so that the pressures exerted by such strip upon the scale may be individually varied as desired. However, it is evident that any other means for immediately stopping the rotation of the scales when disconnected from the driving means may be employed.

Although only one group of detectors is shown, it is understood that many additional groups as disclosed in application, Serial No. 306,407, filed June 24, 1919, by John B. Harlow, adapted for selective association with the switching device may be and usually are employed in a system of this nature. It is also evident that the detectors may be arranged in any other form than that of the equilateral triangle shown.

What is claimed is:

1. In a switching system, a plurality of vibration detectors, an observing station, a binaural observation set thereat, means at the observing station for selectively associating pairs of detectors with the observation set, and a plurality of indicating means adapted for selective association with the observation set under control of the detector selecting means.

2. In a switching system for the detection of mechanical vibrations, a plurality of pairs of vibration detectors, an observing station, a binaural observation set thereat, a compensator included therein to compensate for differences in the time of arrival of vibrations at the detectors of a pair, means at the observing station for selectively associating the pairs of detectors with the observation set, a plurality of indicating means for association with the compensator, and means controlled by the detector selecting means to selectively and operatively associate the indicating means with the compensator.

3. In a switching system for the detection of mechanical vibrations, a plurality of pairs of vibration detectors, an observing station, a binaural observation set thereat including means to compensate for differences in the time of arrival of vibrations at detectors of a pair, a plurality of indicating means, means at the observing station for selectively associating the pairs of detectors with the observing set, and means controlled thereby for selectively associating the indicating means with the observing set, the selected indicating means thereafter being controlled by the compensating means.

4. In an indicating device for a compensator, a rotatable shaft having a longitudinal channel therein, a cam member slidably mounted in the channel, a drum carried by the shaft, a plurality of plungers in the drum opposite the channel, a plurality of normally disconnected indicating scale-carrying sleeves surrounding the drum, and means for moving the member within the channel to cause the cam to selectively engage the plungers, thereby selectively locking the sleeves to the shaft.

5. In an indicating device for a compensator, a rotating shaft having a longitudinal channel therein, a cam member slidably mounted within the channel, a collar loosely surrounding the shaft and engaging the cam member for moving such member along the shaft, a drum carried by the shaft, a plurality of plungers within the drum, a plurality of normally stationary sleeves surrounding the drum and provided with slots in the interior walls thereof, an indicating scale carried by each sleeve, and means for moving the collar to selectively engage the cam with a plunger, thereby causing the engagement thereof with the corresponding sleeve to rotate the associated indicating scale with the shaft.

6. In an indicating device for a compensator, a rotating shaft having a longitudinal channel therein, a member slidably mounted within the channel and having a cam surface, a drum carried by the shaft, a plurality of plungers mounted in the drum, each plunger comprising two portions and means for maintaining a head at one end of one portion projecting from the inside surface of the drum into the channel, and a pin at one end of the other portion substantially flush with the outside surface of the drum, a plurality of normally stationary indicating scale-carrying sleeves surrounding the drum and having slots in the interior surface thereof, means for moving the member in the channel to selectively engage the cam surface thereof with the head of a plunger causing its retraction and the consequent projection of the pin associated therewith into the slot of the associated sleeve whereby such sleeve is carried by the shaft.

In witness whereof, I hereunto subscribe my name this 14th day of July, A. D., 1919.

ROY M. ALLEN.